United States Patent [19]

Yamada

[11] Patent Number: 4,988,139
[45] Date of Patent: Jan. 29, 1991

[54] RETRACTABLE SUN VISOR WITH VARIABLE SHADING FOR AN AUTOMOBILE

[75] Inventor: Masatoshi Yamada, Nagano, Japan
[73] Assignee: Asama Corporation, Nagano, Japan
[21] Appl. No.: 377,190
[22] Filed: Jul. 10, 1989

Related U.S. Application Data

[62] Division of Ser. No. 217,842, Jul. 11, 1988, abandoned.

[30] Foreign Application Priority Data

Mar. 16, 1988 [JP] Japan .................................. 63-62293

[51] Int. Cl.⁵ .............................................. B60J 3/02
[52] U.S. Cl. .................................... 296/97.2; 296/97.4; 296/97.6; 296/97.8; 296/97.11
[58] Field of Search ...................... 296/97.1, 97.2, 97.4, 296/97.6, 97.7, 97.8, 97.9, 97.11

[56] References Cited

U.S. PATENT DOCUMENTS

| | | | |
|---|---|---|---|
| 2,542,409 | 2/1951 | Guenther | 296/97.6 |
| 2,559,471 | 7/1951 | Schrock | 296/97.11 |
| 2,617,680 | 11/1952 | Knoblock | 296/97.9 |
| 2,927,819 | 3/1960 | Johnson | 296/97.8 |
| 3,363,666 | 1/1968 | Hodgson et al. | 296/97.4 X |
| 4,149,749 | 4/1979 | Canal | 296/97.1 |
| 4,264,100 | 4/1981 | Keeler, II | 296/97.8 |
| 4,323,275 | 4/1982 | Lutz | 296/97.8 |
| 4,528,232 | 7/1985 | Cliffe | 296/97.2 X |
| 4,707,018 | 11/1987 | Gavagan | 296/97.8 X |
| 4,792,176 | 12/1988 | Karford | 296/97.8 |
| 4,929,014 | 5/1990 | Clark et al. | 296/97.8 |

FOREIGN PATENT DOCUMENTS

| | | | |
|---|---|---|---|
| 147720 | 8/1952 | Australia | 296/97.2 |
| 904743 | 2/1954 | Fed. Rep. of Germany | 296/97.11 |
| 2400784 | 7/1975 | Fed. Rep. of Germany | 296/97.8 |
| 2806462 | 8/1979 | Fed. Rep. of Germany | 296/97.8 |
| 3136494 | 3/1983 | Fed. Rep. of Germany | 296/97.11 |
| 3415930 | 10/1985 | Fed. Rep. of Germany | 296/97.8 |
| 2357394 | 2/1978 | France | 296/97.2 |
| 686680 | 3/1965 | Italy | 296/97.8 |
| 707957 | 6/1966 | Italy | 296/97.1 |
| 1620 | 2/1985 | Japan . | |
| 18823 | 2/1985 | Japan . | |
| 67621 | 4/1986 | Japan | 296/97.11 |
| 1045160 | 10/1966 | United Kingdom | 296/97.2 |
| 1102089 | 2/1968 | United Kingdom | 296/97.11 |

Primary Examiner—Margaret A. Focarino
Assistant Examiner—Andrew C. Pike

[57] ABSTRACT

A sun visor for an automobile includes a plate formed to be semitransparent wherein the transparency is variable in the vertical direction and the plate is disposed within a housing embedded in an interior roof of the automobile so that the plate can be selectively moved between a used position and an unused position. The plate can be configured to be moved swingably or slidably and, particularly in the case of the slidable plate, the plate can be received into the roof of the automobile.

2 Claims, 5 Drawing Sheets

RETRACTABLE SUN VISOR WITH VARIABLE SHADING FOR AN AUTOMOBILE

This application is a divisional of copending application Ser. No. 07/217,842 filed on Jul. 11, 1988, now abandoned.

FIELD OF THE INVENTION

The present invention relates to a retractable sun visor which shades against the sunlight without interfering with visibility.

DESCRIPTION OF RELATED ART

A sun visor provided with a plate which is swingably disposed within an opening adjacent a roof of an automobile so that the plate is retracted to overlap with the inner surface of the roof in an unused state thereof and pulled out to a position near a front windshield when in use to shade against the sunlight coming into the front of the automobile is known and disclosed in, for example, Japanese Utility Model Unexamined Publication Nos. 60-1620 and 60-18823.

The sun visor disclosed in the above publications employs a plate (shown by phantom line 51 of FIG. 5) formed of the same material as that of the interior wall of the roof 2 to maintain a uniform interior design of the automobile. Accordingly, the plate is opaque over its entire surface area. When the sun visor is not used, the visual range of the automobile driver encompasses the entire front windshield area G, whereas when the sun visor extends substantially parallel to the inner surface of the front windshield G, the visual range of the driver is reduced to about half of the windshield surface area as compared with that in the unused state. Furthermore, when the sun visor is set substantially in the vertical state in accordance with the incident angle of the sunlight at sunrise or sunset, the visual range is even more substantially reduced so as to prevent detection of traffic signals and road signs and thus correspondingly reduces safety while driving. In order to obtain the maximum visual range, the effective area of the plate must be reduced and is insufficient to shade against the sunlight.

Consequently, the conventional sun visor has an inevitable defect whereby the structure thereof must necessarily compromise the safety of the driver in order to achieve a maximum shading effect.

SUMMARY OF THE INVENTION

It is an object of the present invention to provide a sun visor for an automobile which does not obstruct the visual range of the driver by use of a plate and therefore enhances safety when driving.

It is another object of the present invention to provide a sun visor for an automobile which can provide a sufficient area for shading against the sunlight.

It is still another object of the present invention to provide a sun visor for an automobile which is easily attached to an existing automobile, provides excellent visibility, conforms to the inside of a housing adjacent the interior roof of the automobile and easily adjusts to an effective area for shading the sunlight.

In order to achieve the above objects, according to the present invention, a rigid plate 3 of FIG. 1 is swingably disposed or a flexible plate 4 of FIG. 6 is slidably disposed within an overhead housing in an automobile below a roof 2, and the plates 3 or 4 described above are formed to be at least partially semitransparent and have a variable transparency according to a position thereof. Either of the plates 3 or 4 can be selectively moved to a used position and an unused position. It is desirable for the transparency of the plates 3 and 4 to be different both continuously and incontinuously in the vertical direction so that the transparency of the upper portion thereof gradually decreases.

With such a configuration, high visibility through plate 3 or 4 can be achieved. Further, when plate is formed to be semitransparent, the transparency thereof can be selected properly so that glare from the sunlight can be prevented.

DETAILED DESCRIPTION OF THE PREFERRED EMBODIMENTS

Preferred embodiments of the present invention are now described in detail with reference to the drawings.

Referring now to FIGS. 1 through 5, a sun visor 1 according to a first embodiment of the present invention is described. The embodiment illustrates the sun visor 1 including a plate 3 which is swingably mounted with respect to an interior ceiling of the automobile.

The plate 3 is formed of rigid and heat-resistant material such as acrylic, polycarbonatic plate, or glass plate and is formed into a substantially rectangular shape as a whole. The plate 3 is formed to be semitransparent, and the plate 3 is preferably formed so that the transparency of the upper portion thereof gradually decreases in the vertical direction so that the lower portion thereof is almost transparent. Thus, the front outside area around the car can be seen from a driver's seat (or a passenger's seat) due to the variable transparency of the plates. Further, the length of the plate 3 in the vertical direction is selected to be longer than that of a conventional plate 51 shown in FIG. 5. Even when the length is selected to be longer in this manner, a driver's vision in the forward direction is not limited and the effective area for shading against the sunlight can be increased to enhance the shading effect since the plate 3 is semitransparent. The rigid material may possess flexibility to the extent that operation thereof is not prevented when the plate 3 is operated by hand.

Figure 1:
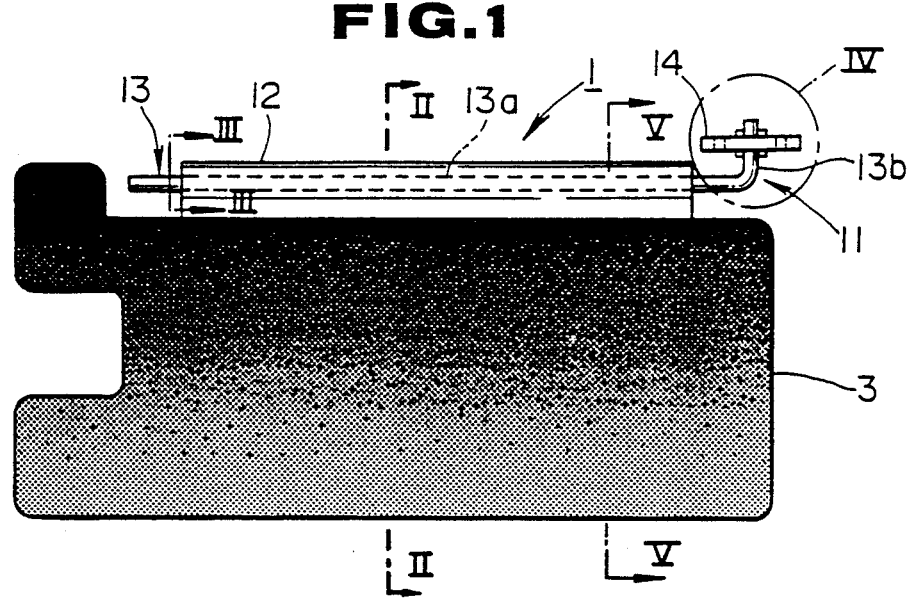
FIG. 1 is a front view of a sun visor according to a first embodiment of the present invention.
Figure 2:
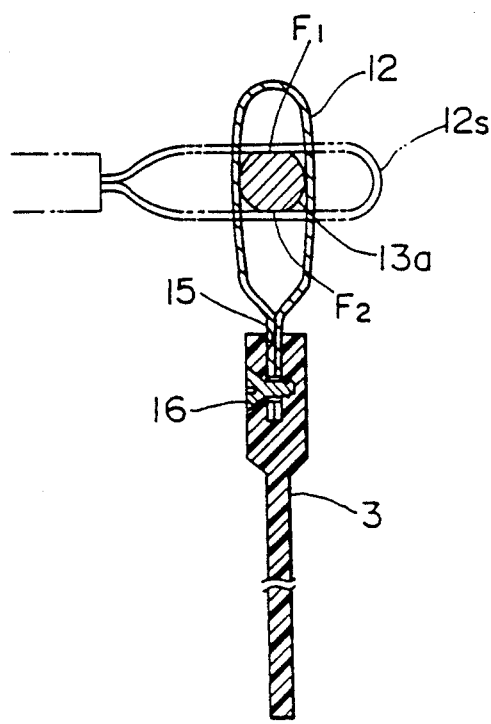
FIG. 2 is a sectional view of the sun visor taken along line II—II of FIG. 1.
Figure 3:
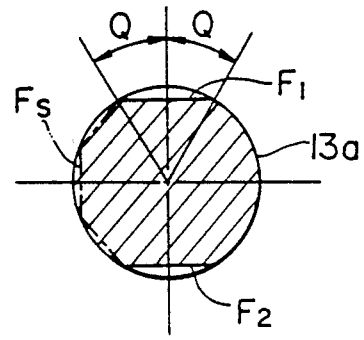
FIG. 3 is a sectional view of a horizontal support shaft of the sun visor taken along line III—III in FIG. 1.

A support unit 11 is coupled with the upper side of the plate 3 to rotatably support the plate 3. The support unit 11 includes a support pipe 12 connected to the plate 3, the support pipe being formed into a compressed ring when viewed in section (refer to FIG. 2) so as to resemble a substantially oval shape. A support shaft 13 is inserted into the support pipe 12 and connected to the support unit 11 for supporting the support pipe 12 and thereby pivotably supporting the plate 3. A mounting base 14 is provided in connection with the support unit 11 for rotatably supporting an end of the support shaft 13. An overlapped end portion of the support pipe 12 is inserted into a slit 15 formed in an edge of the upper side of the plate 3 along the longitudinal direction thereof as shown in FIG. 2 and is fixedly mounted to the plate 3 by screws 16. The support shaft 13 is bent to be formed into an L-shape and includes a horizontal shaft portion 13a and a vertical shaft portion 13b. The horizontal shaft portion 13a is formed with parallel flat surfaces F1 and F2 as shown in FIGS. 2 and 3 and is inserted into the support pipe 12. Further, as shown in FIG. 3, a formation range of the flat surfaces F1 and F2, that is, an angle Q at both sides of the flat surfaces F1 and F2 with respect to the center of the shaft 13a, is preferably equal to about 15 degrees, and the flat surfaces F1 and F2 are substantially parallel with the inner surface of the roof 2 of the automobile. One of the peripheries of the shaft 13a between the flat surfaces F1 and F2 may be formed with polygonal surfaces to hold the support pipe 12 at any angle in a click-stop manner. However, such surfaces are not always necessary.

Figure 5:
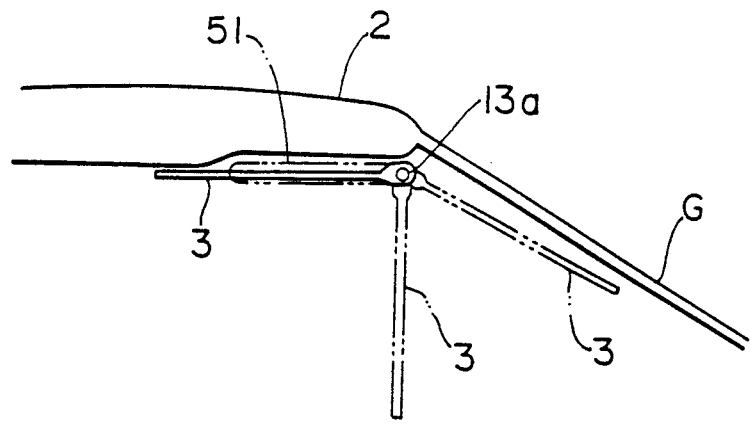
FIG. 5 is a sectional view illustrating the operation of the sun visor taken along line V—V in FIG. 1.

Accordingly, as shown by phantom lines in FIG. 2, when the inner surfaces of the support pipe 12s overlap or engage the flat surfaces F1 and F2 of the horizontal shaft 13a, the plate 3 is parallel to the inner surface of the roof 2. At this time, when an angle of the plate 3 with regard to the inner surface of the roof 2 is less than the angle Q, the plate 3 is automatically brought parallel to the inner surface of the roof 2 by means of a spring and is fixed in that position. When the plate 3 is rotated downward and the angle of the plate 3 exceeds the angle Q, the plate 3 can be stopped and positioned at any desired angle to shade the sunlight as shown in FIG. 5.

Figure 4:
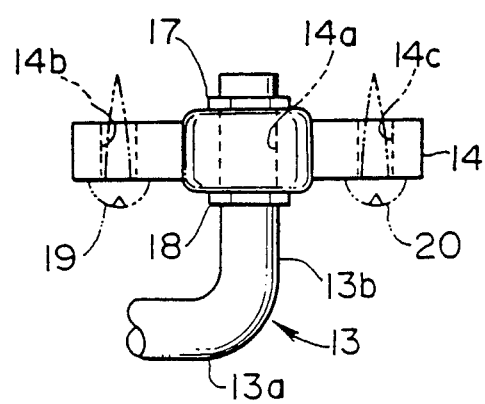
FIG. 4 is an enlarged view of a portion IV of the sun visor shown in FIG. 1.

The vertical shaft 13b of the support shaft 13 is inserted into a support aperture 14a formed in the mounting base 14 as shown in FIG. 4 and is fixed at upper and lower portions thereof by E-rings 17 and 18. Thus, vertical movement of the plate 3 is restricted while horizontal movement around the vertical shaft 13b is allowed to shade against the sunlight coming from the side portion of the automobile. In FIG. 4, numerals 14b and 14c denote holes formed in the base 14 for mounting the base 14 to the inner surface of the roof 2 by screws 19 and 20.

Referring now to FIGS. 6 through 13, a sun visor 1 according to a second preferred embodiment of the present invention is described. The embodiment illustrates the sun visor including a plate 4 which is slidably mounted with respect to the interior roof and windshield of the automobile.

The plate 4 is formed of a synthetic resin plate such as a flexible acrylic plate. The plate 4 is formed to be substantially rectangular and semitransparent. The conditions concerning the semitransparent configuration can be selected in the same manner as those of the plate 3 shown in FIG. 1. In addition, a housing 21 having an opening 21a formed in the front end thereof is embedded into the roof 2. The opening 21a is positioned substantially toward the forward end of the roof 2 adjacent the windshield G. The plate 4 is received in the housing 21 and the front end of the plate 4 is exposed from the opening 21a. A protruding grip portion 22 which can be operated by hand is integrally formed in the front end of the plate 4 and a protruding stopper portion 23 which prevents the plate 4 from being removed from the housing 21 is also integrally formed in the rear end of the plate 4. Further, a flange 24 with which the stopper portion 23 is engagable is integrally formed in the front end of the housing 21, and the inner periphery of the opening 21a is provided with a sealing member 25 which removes dust on the plate 4 and prevents dust from entering the housing 21.

Accordingly, when the grip portion 22 is grasped and the plate 4 is pulled out of the housing 21, the plate 4 can be set in a used position in which the plate 4 overlaps the inner surface of the front glass windshield G. In this case, since the plate 4 is flexibly formed, the plate 4 can be pulled out along the angle of the front glass windshield G. Further, when the plate 4 is pushed back into the housing 21, almost all of the plate 4 can be inserted into the housing. With such a slidable plate 4, since the whole of the sun visor can be retracted into the roof 2, the configuration of the interior of the automobile is not altered and the length of the pulled-out plate 4 can be easily adjusted thereby easily controlling the area for shading against the sunlight.

Figure 7:
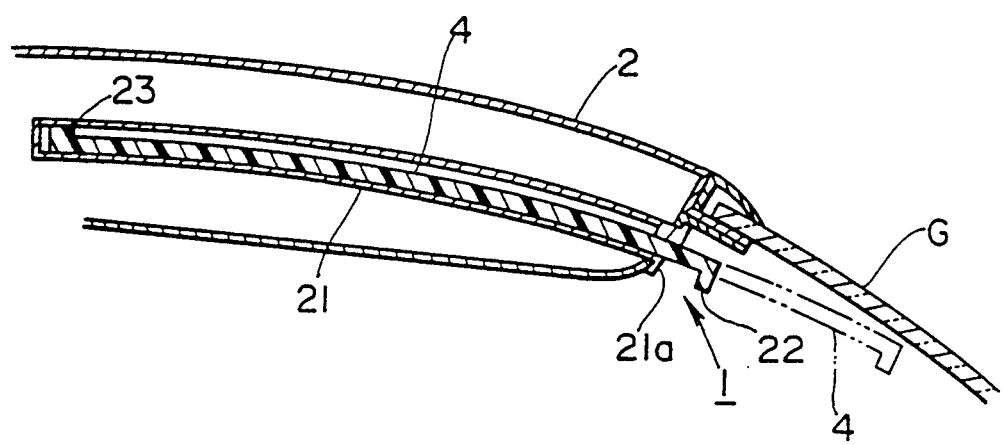
FIG. 7 is a sectional side view of the sun visor taken along line VII—VII in FIG. 6.
Figure 8:
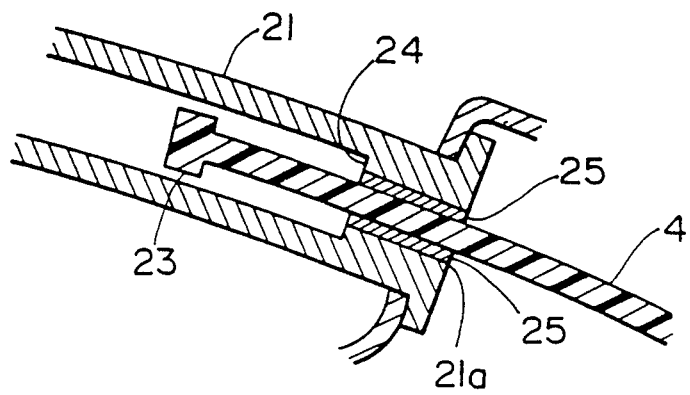
FIG. 8 is an enlarged sectional view of the vicinity of an opening of a case of the sun visor shown in FIG. 7.
Figure 6:
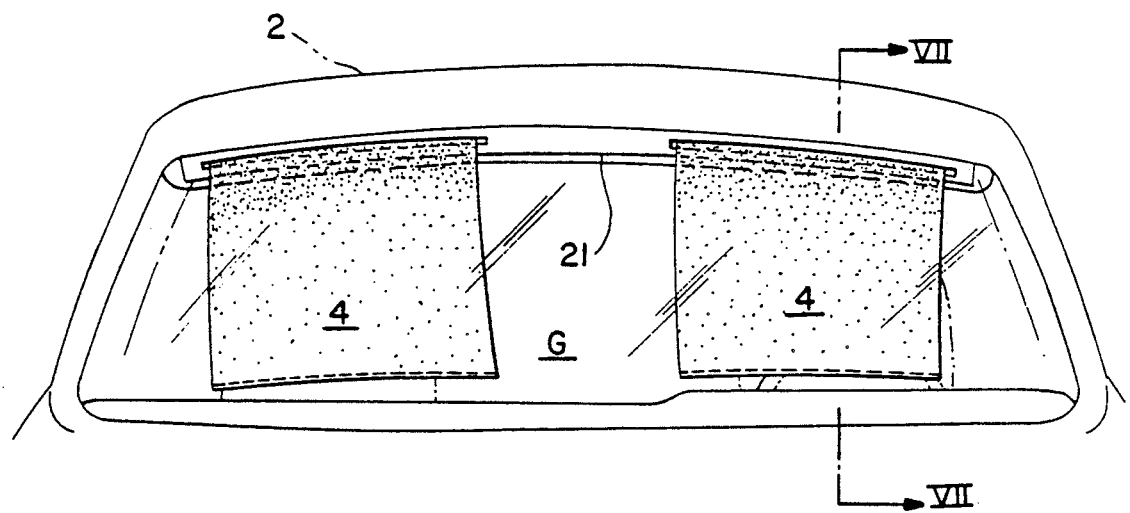
FIG. 6 is a front perspective view of a manually actuable sun visor according to a second embodiment of the present invention.

FIG. 7 shows that the stopper portion 23 may be a perpendicular projection extending to only one side of the plate 14, whereas FIG. 8 shows that the stopper portion 23 may be of a "T" shape at the end of plate 4 for engagement with the flange 24 in each instance.

Figure 9:
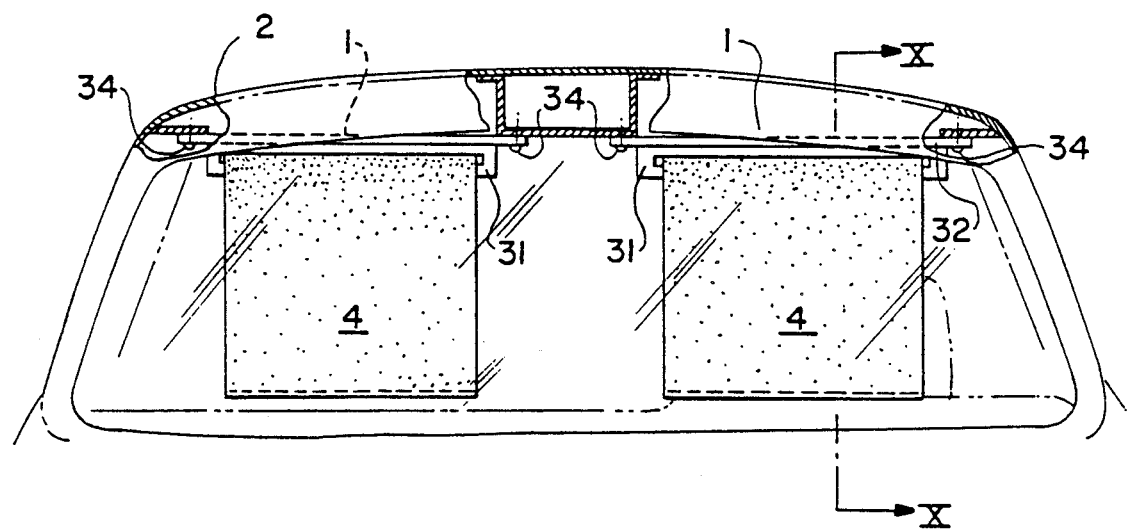
FIG. 9 is a front perspective view of a sun visor according to a modification of the second embodiment.
Figure 10:
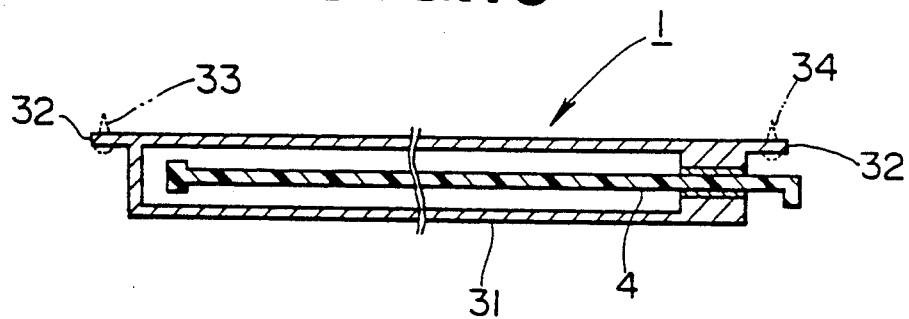
FIG. 10 is a sectional side view of the sun visor taken along line X—X of FIG. 9.

FIG. 7 also shows the housing 21 embedded into the roof 2, while a separate housing 31 may be provided as shown in FIG. 9. The housing 31 is formed with a flange 32 and is mounted to the inner surface of the roof 2 by fixing the flange 32 thereto with screws 33 and 34.

Figure 12:
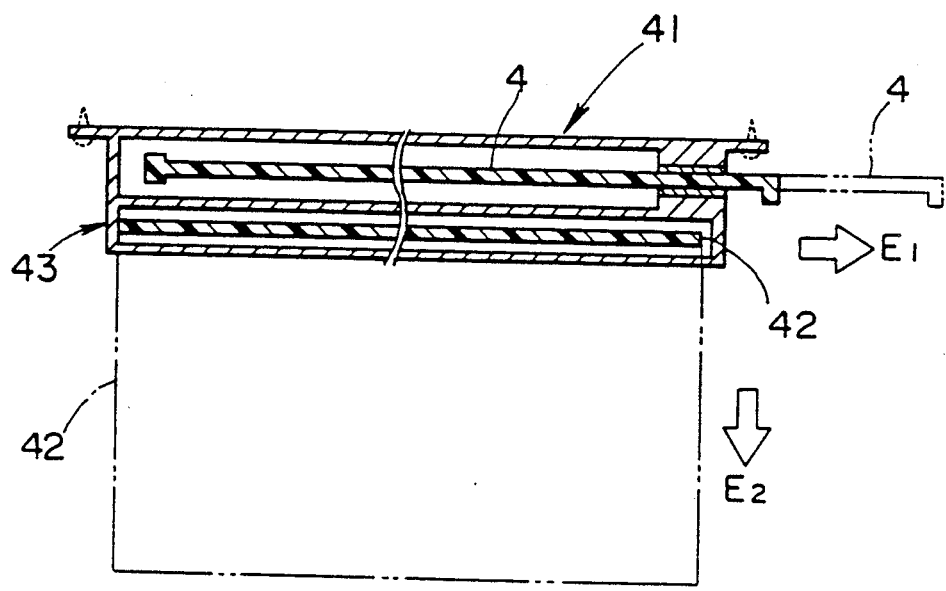
FIG. 12 is a side view schematically illustrating the sun visor taken along line XII—XII of FIG. 11.
Figure 11:
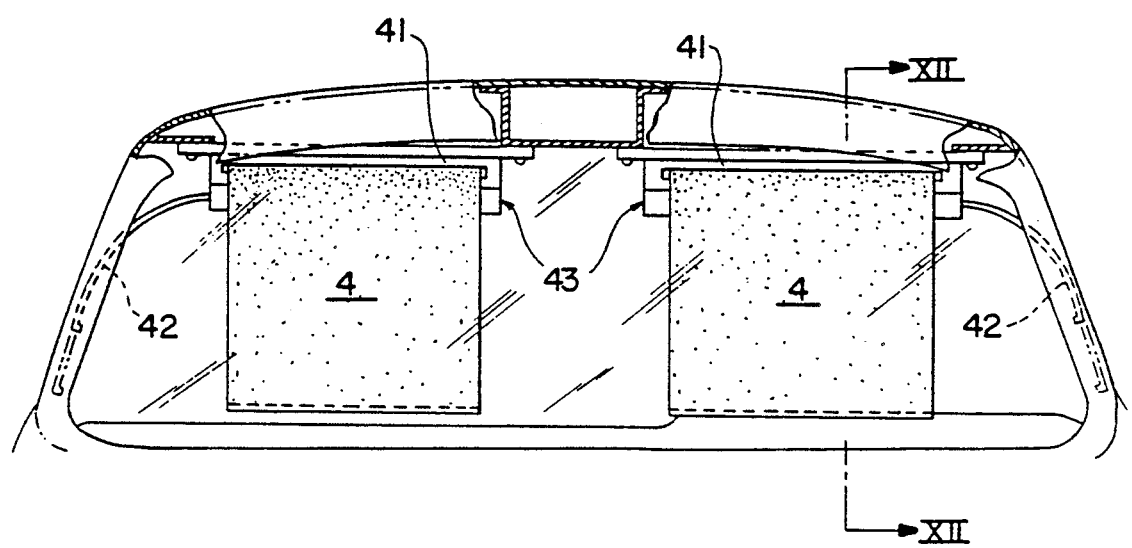
FIG. 11 is a front perspective view of a sun visor shown in FIG. 10.

Further, as shown in FIGS. 11 and 12, a housing 41 includes two interior portions whereby one housing portion 43 thereof receives a plate 42 for the side window which can be pulled out to the side. In this case, the plate 42 can be pulled out in a direction E2 perpendicular to the horizontal plane of pulled-out direction E1 of the plate 4 for the front glass windshield G.

Figure 13:
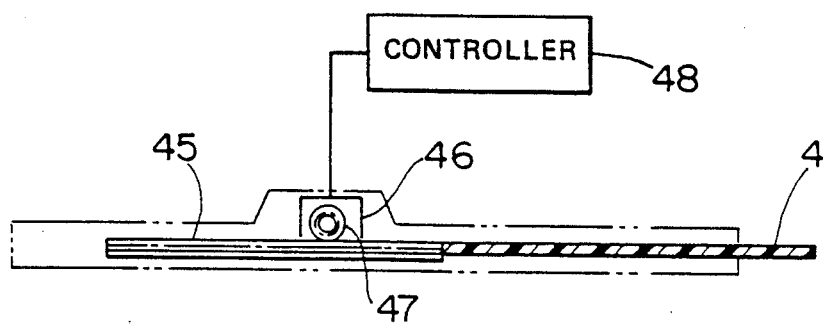
FIG. 13 is a side view schematically illustrating a sun visor according to a further modification of the second embodiment.

Furthermore, FIGS. 6 through 11 show the plate 4 operated manually, while the plate can be configured to be driven by a motor as shown in FIG. 13. When the plate 4 is driven by a motor, a flexible rack 45 is coupled with the rear end of the plate 4 as shown in FIG. 12 and a pinion 47 of a motor driving unit 46 including a reduction mechanism and a motor is meshed with the rack 45. In addition, a controller 48 is provided which controls the motor driving unit and includes an operation switch (not shown).

The present invention is not limited to the embodiments described above and can be modified in configuration, shape, disposition, number, material, and the like without departing from the spirit of the invention.

We claim:

1. A sun visor for an automobile comprising:

a flexible sunlight-shading member formed of a semitransparent material, the semitransparent material varying in transparency according to a position along said sunlight-shading member and wherein the transparency of said flexible sunlight-shading member gradually increases from a base portion to an upper portion thereof;

a housing for storing said flexible sunlight-shading member out of sight in an unused position, wherein said housing includes an opening through which said flexible sunlight-shading member is received;

means for slidably and incrementally removing said flexible sunlight-shading member from said housing to any one of a plurality of sunlight-shading positions and inserting said flexible sunlight-shading member into said housing, said sunlight-shading member being conformable to an angle of a front windshield of the automobile;

a sealing member formed at an inner periphery of the opening for receiving the sunlight-shading member, said sealing member removing debris from said flexible sunlight-shading member upon insertion of said sunlight-shading member into said housing and thereby preventing debris from entering said housing; and an auxiliary housing for storing a peripheral flexible sunlight-shading member out of sight in an unused position, said peripheral flexible sunlight-shading member being slidably removable from and into said auxiliary housing to a plurality of sunlight-shading positions in a direction perpendicular to a horizontal plane of said flexible sunlight-shading member, said auxiliary housing being positioned below said housing.

2. The sun visor of claim 1, wherein said means for slidably and incrementally removing includes means for automatically extending and retracting said sunlight-shading member.

* * * * *